US008155580B2

(12) United States Patent
Maggenti et al.

(10) Patent No.: US 8,155,580 B2
(45) Date of Patent: Apr. 10, 2012

(54) METHODS AND APPARATUS FOR EFFICIENT DATA DISTRIBUTION TO A GROUP OF USERS

(75) Inventors: Mark Maggenti, Del Mar, CA (US); Eric C. Rosen, Solana Beach, CA (US)

(73) Assignee: QUALCOMM Incorporated, San Diego, CA (US)

(*) Notice: Subject to any disclaimer, the term of this patent is extended or adjusted under 35 U.S.C. 154(b) by 928 days.

(21) Appl. No.: 11/473,889

(22) Filed: Jun. 23, 2006

(65) Prior Publication Data

US 2007/0298708 A1 Dec. 27, 2007

(51) Int. Cl.
*H04H 1/00* (2006.01)
(52) U.S. Cl. ............ 455/3.01; 455/428; 455/414.3; 455/435.2; 370/252; 370/301; 370/336; 709/228
(58) Field of Classification Search ............ 455/3.01, 455/3.02, 3.03, 3.05, 3.06, 427, 456.1, 179.1, 455/414.1, 420, 428, 456.2, 456.3, 445, 422.1, 455/503, 414.3, 435.2, 425, 528, 515; 370/395.5, 370/390, 432, 329, 468, 449, 252, 301, 336, 370/312, 332, 331, 469, 401, 338; 709/217, 709/229, 225, 203, 239, 228; 725/94, 95, 725/15, 145, 25, 78
See application file for complete search history.

(56) References Cited

U.S. PATENT DOCUMENTS

| | | | |
|---|---|---|---|
| 6,418,141 B1 | 7/2002 | Votava | |
| 6,477,579 B1* | 11/2002 | Kunkel et al. | 709/229 |
| 2002/0049829 A1* | 4/2002 | Miyawaki | 709/217 |
| 2004/0014475 A1* | 1/2004 | Saito et al. | 455/445 |
| 2004/0078762 A1* | 4/2004 | Lee et al. | 715/536 |
| 2004/0218618 A1* | 11/2004 | Asami | 370/432 |
| 2005/0050157 A1* | 3/2005 | Day | 709/217 |
| 2005/0117345 A1 | 6/2005 | Feistmantl | |
| 2005/0176366 A1* | 8/2005 | Levy | 455/3.06 |
| 2005/0198097 A1* | 9/2005 | Kalnitsky | 709/200 |
| 2005/0259584 A1 | 11/2005 | Chen et al. | |
| 2005/0281270 A1* | 12/2005 | Kossi et al. | 370/395.5 |
| 2006/0007930 A1 | 1/2006 | Dorenbosch | |
| 2006/0094469 A1* | 5/2006 | Kondo | 455/561 |

(Continued)

FOREIGN PATENT DOCUMENTS

EP 1401152 3/2004

(Continued)

OTHER PUBLICATIONS

International Search Report—PCT/US07/071499—International Search Authority—European Patent Office—Dec. 6, 2007.

(Continued)

*Primary Examiner* — Tan Trinh
(74) *Attorney, Agent, or Firm* — Dang Vo; James T. Hagler

(57) ABSTRACT

Methods and apparatus for efficient data distribution to a group of users. In an aspect, a method is provided for distributing information. The method includes detecting one or more requests for the information, determining whether the information is to be broadcast, and transmitting the information in a broadcast transmission based on the determination. In another aspect, an apparatus is provided for distributing information. The apparatus includes a detector configured to detect one or more requests for the information, a determination module configured to determine whether the information is to be broadcast, and a transmitter configured to transmit the information in a broadcast transmission based on the determination.

35 Claims, 4 Drawing Sheets

U.S. PATENT DOCUMENTS

| | | | |
|---|---|---|---|
| 2006/0136291 A1* | 6/2006 | Morita et al. | 705/13 |
| 2006/0242240 A1* | 10/2006 | Parker et al. | 709/205 |
| 2006/0259938 A1* | 11/2006 | Kinoshita et al. | 725/118 |
| 2006/0280166 A1* | 12/2006 | Morris | 370/352 |
| 2007/0010221 A1* | 1/2007 | Howard et al. | 455/179.1 |
| 2007/0054672 A1* | 3/2007 | Onishi et al. | 455/456.1 |
| 2007/0147375 A1* | 6/2007 | Lee et al. | 370/390 |
| 2007/0180119 A1* | 8/2007 | Khivesara et al. | 709/226 |
| 2007/0192812 A1* | 8/2007 | Pickens et al. | 725/94 |
| 2007/0211720 A1* | 9/2007 | Fuchs et al. | 370/390 |
| 2007/0242670 A1* | 10/2007 | Simonson et al. | 370/390 |
| 2007/0280279 A1* | 12/2007 | Mituhasi et al. | 370/428 |
| 2008/0132163 A1* | 6/2008 | Ilan et al. | 455/3.06 |
| 2008/0137682 A1* | 6/2008 | Kish et al. | 370/432 |
| 2008/0212660 A1* | 9/2008 | Tzannes | 375/219 |
| 2008/0282295 A1* | 11/2008 | Gabriel et al. | 725/62 |
| 2009/0103810 A1* | 4/2009 | Echigo et al. | 382/190 |
| 2009/0175235 A1* | 7/2009 | Spinar et al. | 370/329 |

FOREIGN PATENT DOCUMENTS

| | | |
|---|---|---|
| JP | 2000181836 | 6/2000 |
| JP | 2002118553 | 4/2002 |
| JP | 2002165262 | 6/2002 |
| JP | 2002183019 | 6/2002 |
| JP | 2002259430 | 9/2002 |
| JP | 2002353964 | 12/2002 |
| JP | 2005115533 | 4/2005 |
| JP | 2005276079 | 10/2005 |
| KR | 20040025279 | 3/2004 |
| RU | 2221335 | 1/2004 |
| WO | 02067449 | 8/2002 |
| WO | WO2005117345 A1 | 12/2005 |
| WO | WO2005117445 | 12/2005 |

OTHER PUBLICATIONS

Taiwanese Search report—096122763—TIPO—Sep. 21, 2010.
Written Opinion—PCT/US07/071499, International Search Authority, European Patent Office, Dec. 6, 2007.

\* cited by examiner

METHODS AND APPARATUS FOR EFFICIENT DATA DISTRIBUTION TO A GROUP OF USERS

BACKGROUND

1. Field

The present application relates generally to the operation of communication systems, and more particularly, to methods and apparatus for efficient data distribution to a group of users.

2. Background

Data networks, such as wireless communication networks, have to trade off between services customized for a single terminal and services provided to a large number of terminals. For example, the distribution of multimedia content to a large number of devices (users) is a complicated problem. Therefore, it is very important for network administrators, content retailers, and service providers to have a way to distribute content and/or other network services in a fast and efficient manner and in such a way so as to increase bandwidth utilization, to improve power efficiency, and to reduce costs.

In current content delivery/media distribution systems, requests for real time and non real time content and services are received from one or more devices on a network. Servers on the network process each request and provide the requested content in a response to each device. Unfortunately, this technique for serving content may be bandwidth inefficient and expensive since many devices may be requesting the same content. For example, if many devices on a wireless network request the same content from a network server, the content would be re-transmitted many times over expensive air-link resources to satisfy those requests. Such re-transmissions are inefficient and waste expensive network bandwidth.

Therefore is would be desirable to have a system that operates to efficiently distribute data on a network in a way that avoids wasteful re-transmissions of the same data to many requesting devices.

SUMMARY

In one or more embodiments, a distribution system is provided that operates to efficiently distribute data (i.e., content) to a group of devices. In an embodiment, the system operates to maintain one or more parameters that define one or more broadcast conditions. For example, the system maintains a parameter based on how many requests for the same content are received. When the parameter exceeds a threshold value, the system determines that the content is highly desirable and therefore operates to broadcast that content over a broadcast channel. This allows devices to receive the content without having to transit individual requests that would require the same content to be re-transmitted over and over again. Thus, the system operates to efficiently deliver content and avoid wasteful re-transmissions thereby conserving network bandwidth and associated costs.

In an aspect, a method is provided for distributing information. The method comprises detecting one or more requests for the information, determining whether the information is to be broadcast, and transmitting the information in a broadcast transmission based on the determination.

In another aspect, an apparatus is provided for distributing information. The apparatus comprises a detector configured to detect one or more requests for the information, a determination module configured to determine whether the information is to be broadcast, and a transmitter configured to transmit the information in a broadcast transmission based on the determination.

In another aspect, an apparatus is provided for distributing information. The apparatus comprises means for detecting one or more requests for the information, means for determining whether the information is to be broadcast, and means for transmitting the information in a broadcast transmission based on the determination.

In another aspect, a computer-readable medium is provided that embodies a computer program, which when executed, operates to distribute information. The computer program comprises instructions for detecting one or more requests for the information, instructions for determining whether the information is to be broadcast, and instructions for transmitting the information in a broadcast transmission based on the determination.

In still another aspect, at least one processor is provided for distributing information. The at least one processor being configured to detect one or more requests for the information, determine whether the information is to be broadcast, and transmit the information in a broadcast transmission based on the determination.

Other aspects of the embodiments will become apparent after review of the hereinafter set forth Brief Description of the Drawings, Description, and the Claims.

BRIEF DESCRIPTION OF THE DRAWINGS

The foregoing aspects of the embodiments described herein will become more readily apparent by reference to the following detailed description when taken in conjunction with the accompanying drawings wherein.

DETAILED DESCRIPTION

In one or more embodiments, a distribution system is provided that operates to efficiently distribute data to a group of devices. For example, the system is suitable to efficiently distribute data over a wireless communication network. In an embodiment, the distribution system operates to broadcast/multicast information to devices on a network. For the purpose of this description, the term "broadcast" is used herein to describe transmissions including broadcast, multicast, and/or any other transmission that can be received by two or more devices. The system is especially well suited for use in wireless network environments, but may be used in any type of network environment, including but not limited to, communication networks, public networks, such as the Internet, private networks, such as virtual private networks (VPN), local area networks, wide area networks, long haul networks, or any other type of data network.

Figure 1:
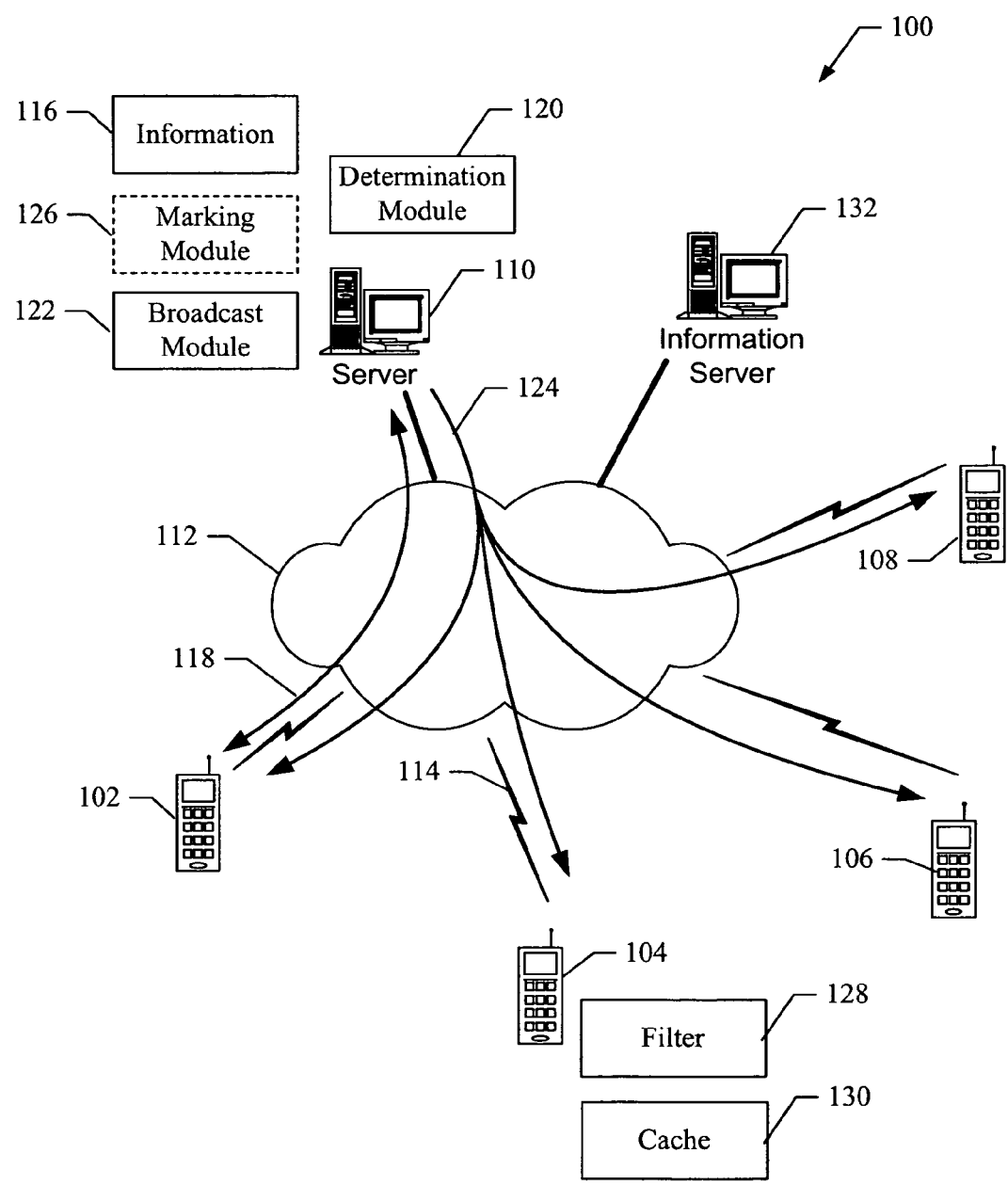
FIG. 1 shows a network that comprises an embodiment of a distribution system.

FIG. 1 shows a network 100 that comprises an embodiment of a distribution system. The network 100 comprises a group of mobile devices (102, 104, 106, and 108), server 110, and a communication network 112. For the purpose of this description, it will be assumed that the network 112 operates to provide wireless communications between the server 110 and the devices 102, 104, 106, and 108.

The devices 102, 104, 106, and 108 in this embodiment comprise mobile telephones that communicate with the network 112 through wireless links 114. In an embodiment, the wireless links 114 comprise wireless communication links based on orthogonal frequency division multiplexing (OFDM) technology; however, in other embodiments the wireless links 114 may comprise other suitable technologies that operate to allow devices to communicate with the network 112. For example, the links 114 may include, but are not limited to, wired and/or air interface components for implementing communication protocols/standards such as World Interoperability for Microwave Access (WiMAX), infrared protocols such as Infrared Data Association (IrDA), short-range wireless protocols/technologies, Bluetooth® technology, ZigBee® protocol, ultra wide band (UWB) protocol, home radio frequency (HomeRF), shared wireless access protocol (SWAP), wideband technology such as a wireless Ethernet compatibility alliance (WECA), wireless fidelity alliance (Wi-Fi Alliance), 802.11 network technology, public switched telephone network technology, public heterogeneous communications network technology such as the Internet, private wireless communications network, land mobile radio network, code division multiple access (CDMA), wideband code division multiple access (WCDMA), universal mobile telecommunications system (UMTS), advanced mobile phone service (AMPS), time division multiple access (TDMA), frequency division multiple access (FDMA), global system for mobile communications (GSM), single carrier (1X) radio transmission technology (RTT), evolution data only (EV-DO) technology, general packet radio service (GPRS), enhanced data GSM environment (EDGE), high speed downlink data packet access (HSPDA), analog and digital satellite systems, or any other suitable technologies/ protocols.

The network 112 comprises any combination of wired and/or wireless networks and operates to communicate with any number and/or types of devices within the scope of the embodiments. For example, other devices suitable for use in embodiments of the distribution system include, but are not limited to, a personal digital assistant (PDA), email device, pager, a notebook computer, mp3 player, video player, or a desktop computer. In an embodiment, the network 112 comprises separate unicast and broadcast networks that operate to provide unicast and broadcast communications between the server 110 and devices in communication with the network 112. In another embodiment, the network 112 is a single network that provides both unicast and broadcast functionality. Thus, the network 112 comprises any suitable combination, arrangement, or configuration of networks that operate to provide embodiments of a distribution system described herein.

In an embodiment, the server 110 comprises information 116 that includes real time and non real time content and/or services. For example, the information 116 comprises multimedia content that includes news, sports, weather, financial information, movies, and/or applications, programs, scripts, or any other type of suitable content or service. Thus, the information 116 may comprise video, audio or other information formatted in any suitable format.

During operation, the device 102 transmits a request 118 to the server 110 to receive some or all of the information 116. For example, the request 118 is a unicast request that flows from the device 102 to the server 110 using the network 112. The server 110 receives the request 118 along with other requests for the information 116 received from other devices in communication with the network 112. In an embodiment, the server 110 operates to respond to each of the unicast requests with the requested information. However, the received requests are also processed during operation of distribution system.

The server 110 comprises a determination module 120. The determination module 120 operates to determine when some or all of the information 116 is to be broadcast over the network 112. In an embodiment, the determination module 120 operates to detect the received requests and to determine if the requested information is of interest to many devices. For example, in an embodiment, the determination module 120 operates to keep track of the total number of requests for the information, and if that total number exceeds a threshold value, the determination module 120 determines that the information is of interest to enough devices that it would be efficient to broadcast the information on the network 112. The broadcast threshold may be set to any value to indicate a level of interest needed to cause a broadcast to occur.

In an embodiment, the determination module 120 may perform any algorithm to determine whether the information 116 is to be broadcast. For example, the algorithm may be based on the number and/or rate of the received requests, the region of the received requests, the importance of the information, the time of the received requests, and/or any other characteristics associated with the requests or the operation of the network 112. Thus, the determination module 120 operates to maintain one or more parameters that define one or more broadcast conditions. If the broadcast conditions are met, the determination module 120 operates to cause a broadcast to occur.

Once the determination module 120 has determined that the information is to be broadcast, a broadcast module 122 at the server 110 operates to broadcast the information over a broadcast channel provided by the network 112 as shown by broadcast 124. In an embodiment, the server 110 optionally comprises a marking module 126. The marking module 126 operates to mark (or tag) the information in the broadcast 124 so that devices able to listen to the broadcast 124 can determine if the broadcast 124 is of interest to them.

The device 104 is coupled to the network 112 and is able to listen to the broadcast 124. The device 104 comprises filter 128 that operates to filter the broadcast 124 to determine if the broadcast 124 contains content of interest. For example, the device 104 may listen to the broadcast 124 and use any markings or tags associated with the broadcast 124 to determine if the broadcast 124 contains financial information. If the broadcast 124 contains financial information, then the filter 128 allows the device 104 to receive the broadcast 124 and store the financial information in a local cache 130 for later presentation. For example, when a user of the device 104 attempts to obtain financial information from the network 112, the device 104 first checks the cache 130 to see if the information has been locally stored. If the information is in the cache 130, then the device 104 can present the information from the cache 130 to the device user without having to access the network 112.

Therefore, embodiments of a distribution system operate to efficiently distribute information to devices on a network by performing one or more of the following functions.

a. Detect one or more requests for information.
  b. Maintain one or more parameters that define one or more broadcast conditions.
  c. Determine that the information is to be broadcast based on the broadcast conditions.
  d. Optionally mark the information with one or more markers.
  e. Broadcast the information over a broadcast channel.

In another embodiment, the information 116, marking module 126, and/or broadcast module 122 may be located at one or more other servers or network entities. For example, the information 116, marking module 126, and/or broadcast module 122 may be located at the information server 132. In this embodiment, the determination module 120 at the server 110 contacts the information server 132 if it determines that the information 116 is to be broadcast. The information server 132 then provides the broadcast 124 as described above.

Therefore, embodiments of a distribution system operate to efficiently distribute information to one or more devices on a network. It should be noted that the distribution system is not limited to the implementations described with reference to FIG. 1, and that other implementations are possible within the scope of the embodiments.

Figure 2:
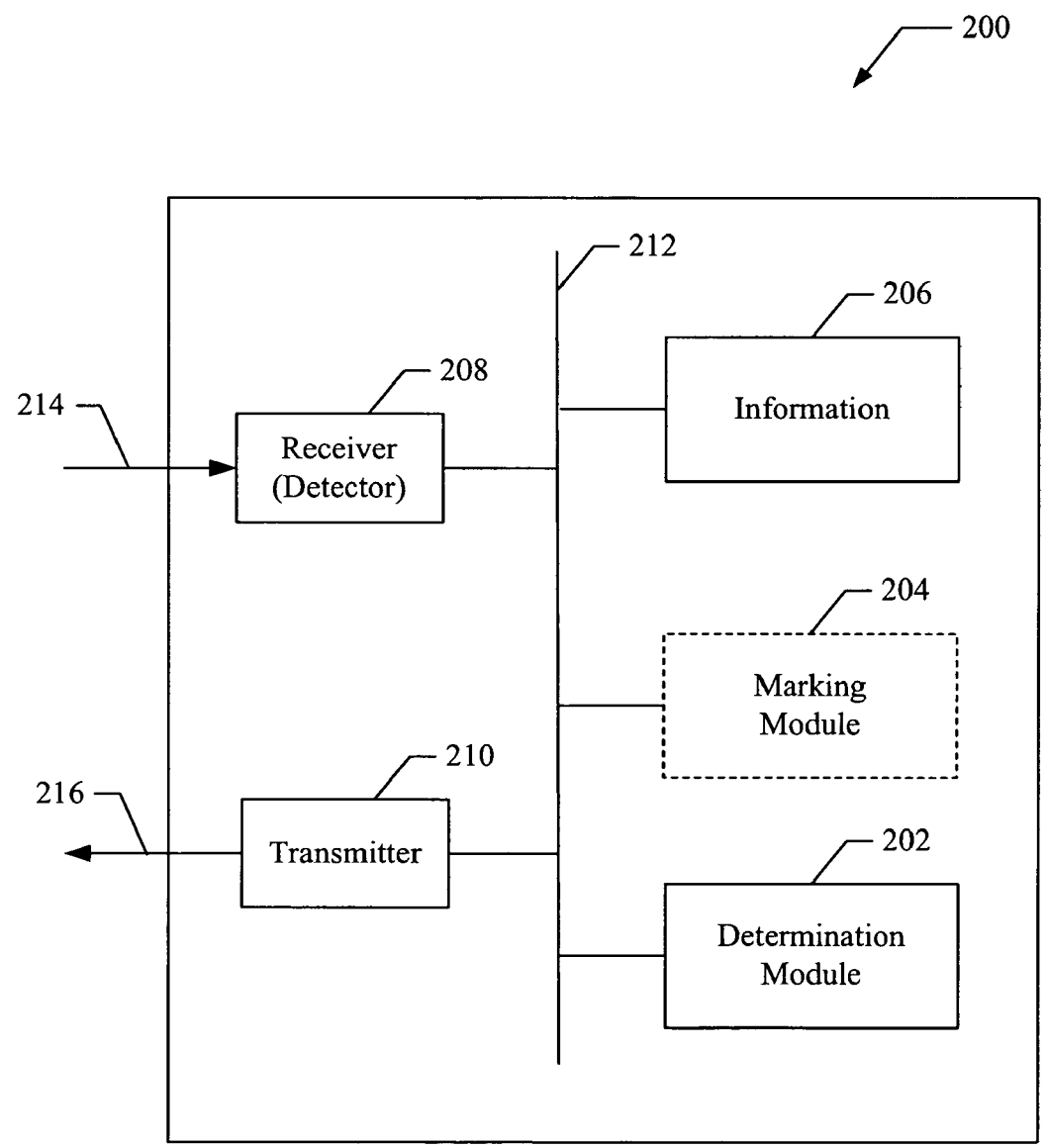
FIG. 2 shows a server for use in an embodiment of a distribution system.

FIG. 2 shows a server 200 for use in an embodiment of a distribution system. The server 200 comprises determination module 202, marking module 204, information 206, receiver/detector 208, and transmitter 210 all coupled to a data bus 212.

The information 206 comprises any type of real time and non real time content and/or services that are available at the server 200. In another embodiment, the information 206 represents content or services to which the server 200 has access. For example, the server 200 may have access to other servers or network entities through which the information 206 is available.

The receiver/detector 208 comprises any suitable hardware and/or software that operate to allow the server 200 to process requests for information received over a distribution network. The receiver/detector 208 operates to receive and/or detect one or more requests 214 for the information 206. For example, in an embodiment, the receiver/detector 208 operates to detect unicast requests for the information 206 from devices on a network.

The determination module 202 comprises a CPU, processor, gate array, hardware logic, virtual machine, memory, software, and/or any combination of hardware and software. The determination module 202 operates to maintain one or more parameters that define one or more broadcast conditions, and to process requests for the information 206 to determine whether any of the broadcast conditions have been met. For example, the determination module 202 maintains one or more parameters that are associated with requests for the information and/or the operation of a distribution network. For example, the parameters may describe the number and/or rate of the received requests, the region of the received requests, the importance of the information being requested, the time of the received requests, and/or any other characteristics associated with the requests or the operation of the network.

The determination module 202 operates to perform an algorithm to determine if requested information is to be broadcast based on one or more of the broadcast conditions. In an embodiment, the algorithm determines if a broadcast threshold is exceeded. For example, a parameter may describe the total number of requests received for some or all of the information 206. The determination module 202 operates to determine if the number of requests exceeds a broadcast threshold. Exceeding the threshold indicates that there are many devices interested in the information, and so the determination module 202 determines that the information is to be broadcast. The determination module 202 is not limited to measuring the number of requests, and may operate to provide any algorithm to determine the interest for particular information and thereby decide whether to broadcast that information based on one or more broadcast conditions.

The marking module 204 is optional and comprises a CPU, processor, gate array, hardware logic, virtual machine, memory, software, and/or any combination of hardware and software. The marking module 204 operates to mark or tag information to be broadcast with one or more markings or tags to describe some aspect of the information. For example, the information may be marked to indicate type, size, regional destination, content, age, or any other aspect of the information.

The transmitter 210 comprises any suitable hardware and/or software that operate to allow the server 200 to communicate with a distribution network. For example, the transmitter 210 comprises broadcast logic that allows the server 200 to broadcast information over a broadcast channel 216 provided by a wireless network as illustrated in FIG. 1. In an embodiment, if the determination module 202 determines that information is to be broadcast, the transmitter 210 operates to broadcast the information using the broadcast channel 216. The transmitter 210 also comprises unicast logic that allows the transmitter 210 to perform unicast transmissions if necessary.

During operation, one or more requests for information are detected by the receiver/detector 208. Based on the detected requests, the determination module 202 operates to determine if one or more broadcast conditions have been met. For example, the determination module 202 operates to determine if a threshold has been exceeded based on parameters associated with the requests. For example, the determination module 202 operates to determine if the number of requests for the information exceeds a broadcast threshold. If the broadcast threshold has been exceeded, the determination module 202 determines that the information is to be broadcast over a broadcast channel. In an optional process, the marking module 204 operates to mark the information with any suitable markings or tags. The transmitter 210 operates to broadcast the information over the broadcast channel 216. Thus, devices may listen to the broadcast to determine if the information is of interest to them, and if it is, the information may be stored at those devices for later presentation.

In an embodiment, the determination module 202 may also communicate with one or more other entities to broadcast the information as necessary. For example, the determination module 202 may determine that selected information is to be broadcast and transmit a request through the transmitter 210 to another network server or other entity requesting that the selected information be broadcast.

In an embodiment, the distribution system comprises a computer-readable medium embodying a computer program having one or more program instructions ("instructions"), which when executed, provides the functions of the distribution system described herein. For example, instructions may be loaded into the determination module 202 from a computer-readable medium, such as a floppy disk, CDROM, memory card, FLASH memory device, RAM, ROM, or any other type of memory device. In another embodiment, the instructions may be downloaded from an external device or network resource. The instructions, when executed, operate to provide embodiments of a distribution system as described herein.

In another embodiment, the determination module 202, marking module 204, receiver/detector 208, and transmitter 210 are implemented by one or more processors configured to execute program instructions to provide embodiments of a distribution system as described herein.

Thus, the server 200 operates to efficiently distribute information to devices on a network. It should be noted that the server 200 is just one implementation and the other implementations are possible within the scope of the embodiments.

Figure 3:
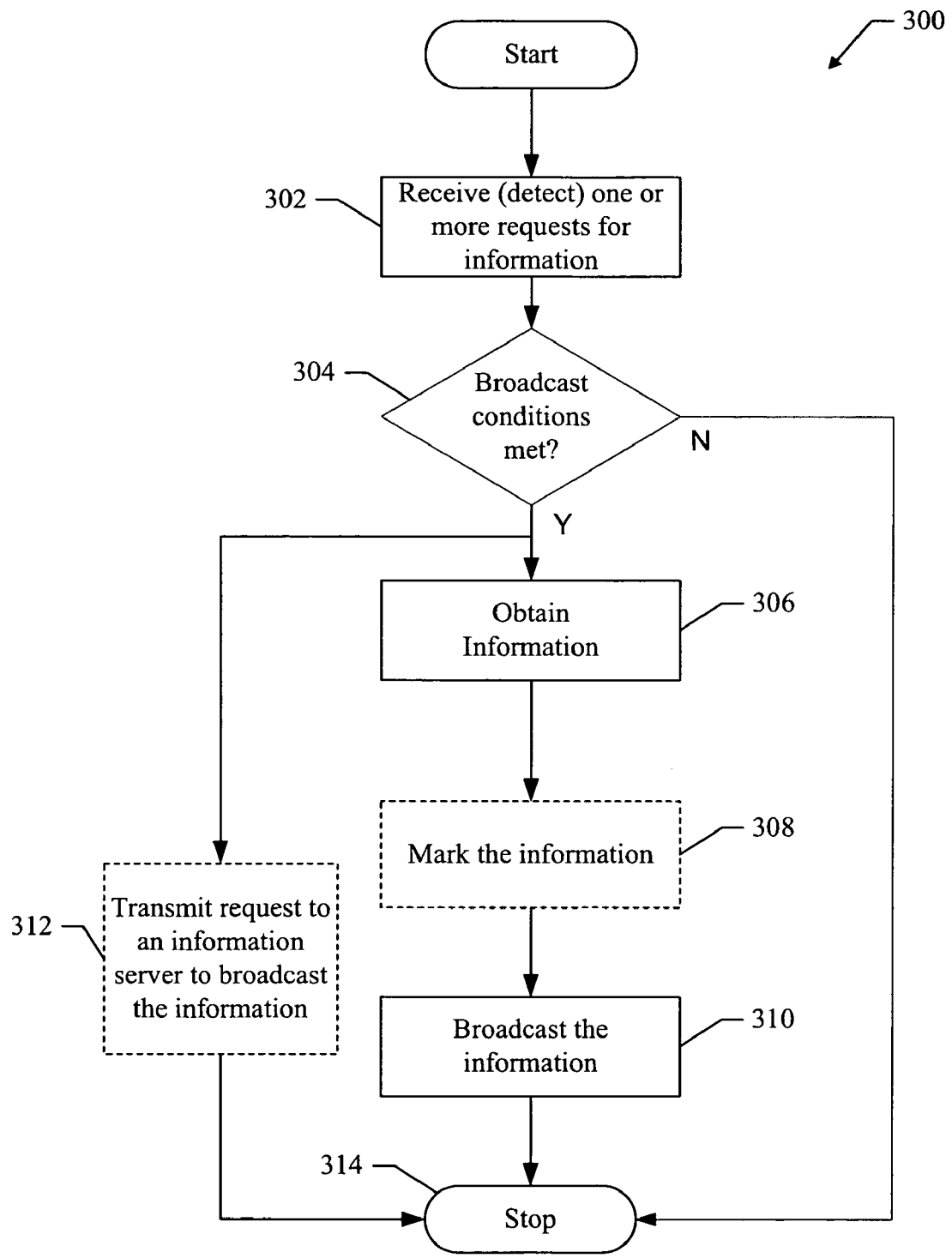
FIG. 3 shows a method for providing an embodiment of a distribution system.

FIG. 3 shows a method 300 for providing an embodiment of a distribution system. For example, in an embodiment, the server 200 is configured to perform the method 300 as describe below.

At block 302, one or more requests for information are received and/or detected. For example, one or more unicast requests for information are detected from one or more devices. In an embodiment, the requests are received or detected by the receiver/detector 208.

At block 304, a test is performed to determine if one or more broadcast conditions are met. In an embodiment, the determination is made by the determination module 202 and is based on any parameters associated with the information, received requests, and/or network operation. For example, in an embodiment, a broadcast threshold is determined that indicates the total number of requests that need to be detected before of the information will be broadcast over the network. If the total number of requests for the information exceeds the broadcast threshold, then the determination module 202 determines that the information is to be broadcast. It should be noted that virtually any criteria related to the information, requests, and/or network operation could be used to determine if the information is to be broadcast. If the information is not to be broadcast, the method stops at block 314. If the information is to be broadcast, the method proceeds to block 306.

At block 306, the information to be broadcast is obtained. For example, the information may be locally stored, as illustrated by the information 206 shown in FIG. 2. In another embodiment, the information is retrieved from another entity, such as a network server or content provider. For example, the determination module 202 may operate to request the information through the transmitter 210 and receive the information through the receiver/detector 208.

At block 308, in an optional function, the information is marked to indicate any type of characteristic associated with the information. For example, the information may be marked to indicate the type of information, its intended distribution region, the importance of the information, its intended recipients, age, and/or any other characteristic. In an embodiment, the marking module 204 operates to mark the information.

At block 310, the information is broadcast over a network. For example, the information is broadcast over a broadcast channel in a wireless network to one or more mobile devices. In an embodiment, the information is broadcast over the broadcast channel 216 by the transmitter 210.

In an alternative operation, block 312 is performed if it is determined that the information is to be broadcast at block 304. At block 310, a request is sent to an information server to broadcast the information. For example, the server 200 sends a request to an information server through the transmitter 210 to broadcast the information. Thus, the functions of the distribution system may be distributed over one or more network entities and are not limited to being performed by a single entity.

Thus, the method 300 operates to provide an embodiment of a distribution system. It should be noted that the method 300 represents just one implementation and that changes, additions, deletions, combinations or other modifications of the method 300 are possible within the scope of the embodiments.

Figure 4:
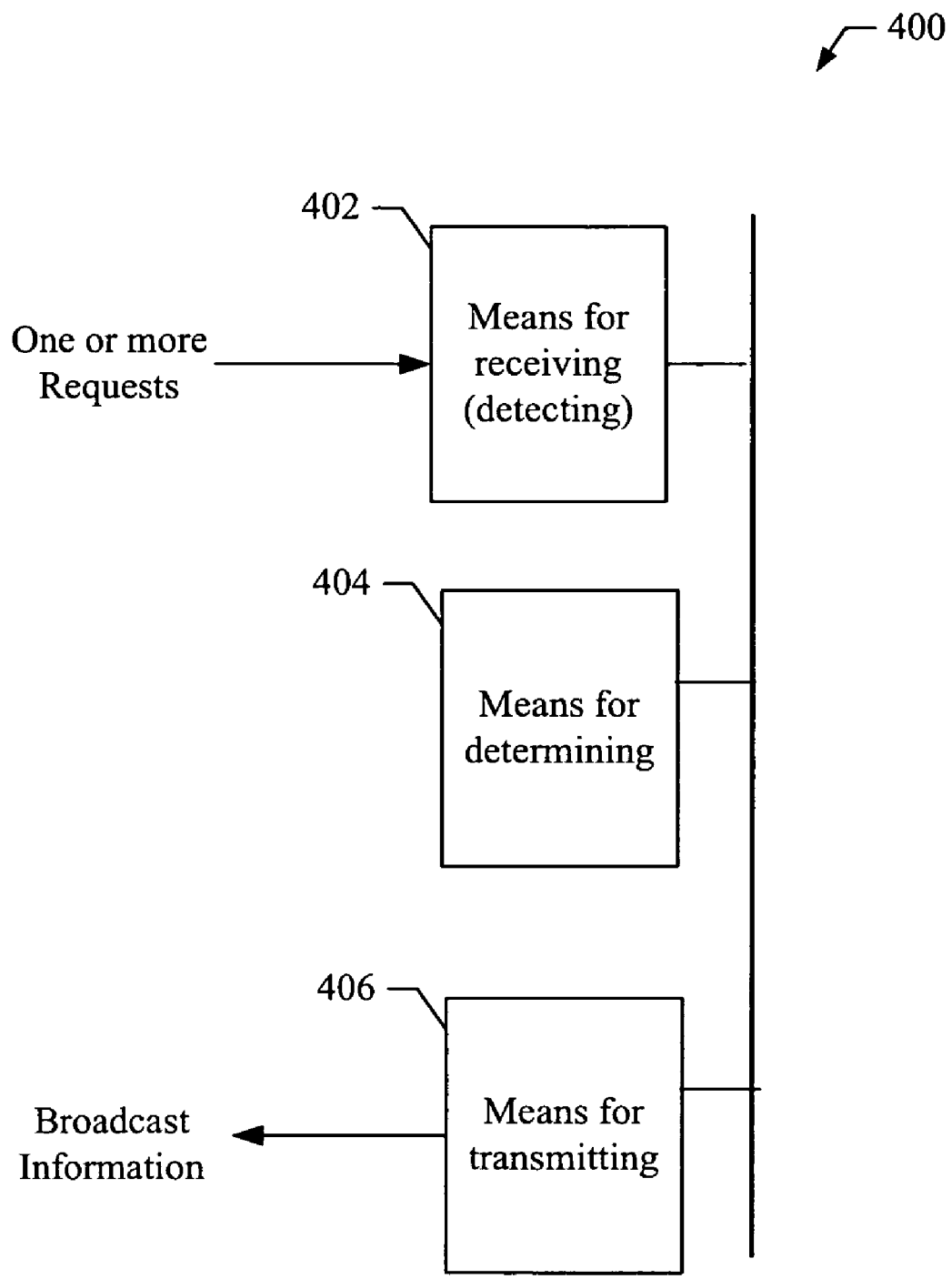
FIG. 4 shows an embodiment of a distribution system.

FIG. 4 shows an embodiment of a distribution system 400. The distribution system 400 comprises means (402) for detecting one or more request for information. For example, in an embodiment, means 402 comprises the receiver/detector 208 shown in FIG. 2. The distribution system 400 also comprises means (404) for determining whether the information is to be broadcast. For example, in an embodiment, the means 404 comprises the determination module 202 shown in FIG. 2. The determination system 400 also comprises means (406) for transmitting the information in a broadcast transmission. For example, in an embodiment, the means 406 comprises the transmitter 210 shown in FIG. 2. In another embodiment, the means 402, 404, and 406 are implemented by at least one processor configured to execute program instructions to provide embodiments of a distribution system as described herein.

Therefore various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments.

Accordingly, while embodiments of a distribution system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

What is claimed is:

1. A method for distributing information, comprising:
   detecting in a server one or more requests for transmission of the information via unicast;
   determining in the server based on the one or more requests whether to transition from transmitting the information via unicast to transmitting the information via broadcast;
   associating a marker with the information;
   embedding the information and associated marker into a communication signal suitable for transmission via broadcast; and
   transmitting from the server the communication signal based on the determination.

2. The method of claim 1, wherein the one or more requests are associated with one or more unicast transmissions.

3. The method of claim 1, wherein determining in the server based on the one or more requests whether to transition from transmitting the information via unicast to transmitting the information via broadcast comprises determining that the information is to be transmitted via broadcast if one or more broadcast conditions are met.

4. The method of claim 1, wherein determining in the server based on the one or more requests whether to transition from transmitting the information via unicast to transmitting the information via broadcast comprises comparing a parameter associated with the one or more requests to a threshold value.

5. The method of claim 4, wherein determining in the server based on the one or more requests whether to transition from transmitting the information via unicast to transmitting the information via broadcast comprises determining to transmit the information via broadcast if the parameter exceeds the threshold value.

6. The method of claim 4, wherein comparing a parameter associated with the one or more requests to a threshold value comprises determining if the parameter is equal to a number of the one or more requests that are detected.

7. The method of claim 4, wherein comparing a parameter associated with the one or more requests to a threshold value comprises determining if the parameter is equal to a number of requests detected within a selected time interval.

8. A server of a communication system configured to distribute information, the server comprising:
   a detector configured to detect one or more requests for transmission of the information via unicast;
   a determination module configured to determine based on the one or more requests whether to transition from transmitting the information via unicast to transmitting the information via broadcast;
   a marker module configured to associate a marker with the information; and
   a transmitter configured to embed the information and associated marker into a communication signal suitable for transmission via broadcast and transmit the communication signal based on the determination.

9. The server of claim 8, wherein the one or more requests are associated with one or more unicast transmissions.

10. The server of claim 8, wherein the determination module is configured to determine that the information is to be broadcast if one or more broadcast conditions are met.

11. The server of claim 8, wherein the determination module is configured to compare a parameter associated with the one or more requests to a threshold value.

12. The server of claim 11, wherein the determination module is configured to determining to transmit the information via broadcast if the parameter exceeds the threshold value.

13. The server of claim 11, wherein comparing a parameter associated with the one or more requests to a threshold value comprises determining if the parameter is equal to a number of the one or more requests that are detected.

14. The server of claim 11, wherein comparing a parameter associated with the one or more requests to a threshold value comprises determining if the parameter is equal to a number requests detected within a selected time interval.

15. A server of a communication system configured to distribute information, the server comprising:
   means for detecting one or more requests for transmission of the information via unicast;
   means for determining based on the one or more requests whether to transition from transmitting the information via unicast to transmitting the information via broadcast;
   means for associating a marker with the information;
   means for embedding the information and associated marker into a communication signal suitable for broadcast transmissions; and
   means for transmitting the communication signal based on the determination.

16. The server of claim 15, wherein means for detecting one or more requests for transmission of the information via unicast comprises means for determining whether the one or more requests are associated with one or more unicast transmissions.

17. The server of claim 15, wherein means for determining based on the one or more requests whether to transition from transmitting the information via unicast to transmitting the information via broadcast comprises means for determining to broadcast the the information if one or more broadcast conditions are met.

18. The server of claim 15, wherein means for determining based on the one or more requests whether to transition from transmitting the information via unicast to transmitting the information via broadcast comprises means for comparing a parameter associated with the one or more requests to a threshold value.

19. The server of claim 18, wherein means for comparing a parameter associated with the one or more requests to a threshold value comprises means for determining to broadcast the information if the parameter exceeds the threshold value.

20. The server of claim 18, wherein means for comparing a parameter associated with the one or more requests to a threshold value comprises means for determining to broadcast the information if the parameter is equal to a number of the one or more requests that are detected.

21. The server of claim 18, wherein means for comparing a parameter associated with the one or more requests to a threshold value comprises means for determining to broadcast the information if the parameter is equal to a number of the one or more requests that are detected within a selected time interval.

22. A non-transitory computer-readable storage media having stored thereon processor-executable software instructions configured to cause a processor to perform operations for distributing information, the operations comprising:
   detecting one or more requests for transmission of the information via unicast;
   determining based on the one or more requests whether to transition from transmitting the information via unicast to transmitting the information via broadcast;
   associating a marker with the information;
   embedding the information and associated marker into a communication signal suitable for transmission via broadcast; and transmitting the communication signal based on the determination.

23. The non-transitory computer-readable storage media of claim 22, wherein the stored processor-executable software instructions are configured to cause a processor to perform operations further comprising:
detecting whether the one or more requests are associated with one or more unicast transmissions.

24. The non-transitory computer-readable storage media of claim 22, wherein the stored processor-executable software instructions are configured to cause a processor to perform operations further comprising:
determining that the information is to be broadcast if one or more broadcast conditions are met.

25. The non-transitory computer-readable storage media of claim 22, wherein the stored processor-executable software instructions are configured to cause a processor to perform operations further comprising:
comparing a parameter associated with the one or more requests to a threshold value.

26. The non-transitory computer-readable storage media of claim 25, wherein the stored processor-executable software instructions are configured to cause a processor to perform operations further comprising:
determining to broadcast the information if the parameter exceeds the threshold value.

27. The non-transitory computer-readable storage media of claim 25, wherein the stored processor-executable software instructions are configured to cause a processor to perform operations further comprising:
determining to broadcast the information if the parameter is equal to a number of the one or more requests that are detected.

28. The non-transitory computer-readable storage media of claim 25, wherein the stored processor-executable software instructions are configured to cause a processor to perform operations further comprising: p1 determining to broadcast the information if the parameter is equal to a number of the one or more requests that are detected within a selected time interval.

29. A server of a communication system configured to distribute information, the server comprising:
a memory; and
a processor coupled to the memory, wherein the processor is configured with processor- executable instructions to perform operations comprising:
detecting one or more requests for transmission of the information via unicast;
determining based on the one or more requests whether to transition from transmitting the information via unicast to transmitting the information via broadcast;
associating a marker with the information;
embedding the information and associated marker into a communication signal suitable for transmission via broadcast; and
transmitting the communication signal based on the determination.

30. The server of claim 29, wherein the processor is configured with processor-executable instructions such that detecting one or more requests for transmission of the information via unicast comprises determining whether the one or more requests are associated with one or more unicast transmissions.

31. The server of claim 29, wherein the processor is configured with processor-executable instructions such that determining based on the one or more requests whether to transition from transmitting the information via unicast to transmitting the information via broadcast comprises determining to broadcast the information if one or more broadcast conditions are met.

32. The server of claim 29, wherein the processor is configured with processor-executable instructions such that determining based on the one or more requests whether to transition from transmitting the information via unicast to transmitting the information via broadcast comprises determining to broadcast the information based on comparing a parameter associated with the one or more requests to a threshold value.

33. The server of claim 32, wherein the processor is configured with processor-executable instructions such that determining to broadcast the information based on comparing a parameter associated with the one or more requests to a threshold value comprises determining to broadcast the information if the parameter exceeds the threshold value.

34. The server of claim 32, wherein the processor is configured with processor-executable instructions such that determining to broadcast the information based on comparing a parameter associated with the one or more requests to a threshold value comprises determining to broadcast the information if the parameter is equal to a number of the one or more requests that are detected.

35. The server of claim 32, wherein the processor is configured with processor-executable instructions such that determining to broadcast the information based on comparing a parameter associated with the one or more requests to a threshold value comprises determining to broadcast the information if the parameter is equal to a number of the one or more requests that are detected within a selected time interval.

* * * * *